(12) United States Patent
Takenoiri et al.

(10) Patent No.: US 6,858,320 B2
(45) Date of Patent: Feb. 22, 2005

(54) PERPENDICULAR MAGNETIC RECORDING MEDIUM

(75) Inventors: Shunji Takenoiri, Nagano (JP); Yasushi Sakai, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 40 days.

(21) Appl. No.: 10/153,887

(22) Filed: May 24, 2002

(65) Prior Publication Data

US 2002/0182446 A1 Dec. 5, 2002

(30) Foreign Application Priority Data

May 30, 2001 (JP) ........................................ 2001-162638

(51) Int. Cl.[7] .............................. G11B 5/66; G11B 5/667
(52) U.S. Cl. ........................ 428/611; 428/662; 428/663; 428/680; 428/681; 428/336; 428/694 TS
(58) Field of Search .......................... 428/694 TS, 693, 428/694 TP, 611, 662, 663, 680, 681, 336

(56) References Cited

U.S. PATENT DOCUMENTS

| | | | | |
|---|---|---|---|---|
| 4,632,883 | A | * 12/1986 | Howard et al. | ............ 428/611 |
| 2001/0009727 | A1 | * 7/2001 | Akimoto et al. | ......... 428/694 T |
| 2001/0023032 | A1 | * 9/2001 | Uwazumi et al. | ...... 428/694 TS |
| 2002/0018917 | A1 | * 2/2002 | Sakai et al. | .......... 428/694 TM |
| 2002/0018920 | A1 | * 2/2002 | Yamamoto et al. | .... 428/694 TS |
| 2002/0119350 | A1 | * 8/2002 | Tomiyasu et al. | ...... 428/694 TS |
| 2002/0127433 | A1 | * 9/2002 | Shimizu et al. | ...... 428/694 TM |

FOREIGN PATENT DOCUMENTS

| | | | | |
|---|---|---|---|---|
| JP | 60-143424 | * 7/1985 | ............ | G11B/5/66 |
| JP | 09-120521 | 5/1997 | | |
| JP | 09-120521 A | * 6/1997 | | |
| JP | 2002-352417 | * 12/2002 | ........... | G11B/5/738 |

OTHER PUBLICATIONS

JPO Abstract Translation of JP 09–120521–A (Doc. ID: JP 09120521 A).*
Machine Translation of JP 09–120521–A.*
Mark's Standard Handbook for Mechanical Engineers (10th Edition) (McGraw–Hill, 1996, title page and p. 6–33).*
Kinzoku Binran; p. 1028 of Revised 4th Version (Handbook of Metals), Edited by the Japan Institute of Metals, Dec. 1982, 3 pp.

* cited by examiner

*Primary Examiner*—Kevin M. Bernatz (57) ABSTRACT

A performance of a perpendicular magnetic recording medium, such as an increase in output or a decrease in noise, is improved by providing a good orientation of a magnetic recording layer in the perpendicular magnetic recording medium and by reducing an amount of an initial growth layer in the magnetic recording layer. The perpendicular magnetic recording medium includes an under layer, a magnetic recording layer, a protective film, and a liquid lubrication layer, which are sequentially provided on a non-magnetic substrate. The under layer contains non-magnetic NiFeCr or a permalloy-based soft magnetic material.

9 Claims, 5 Drawing Sheets

PERPENDICULAR MAGNETIC RECORDING MEDIUM

CROSS-REFERENCE TO RELATED APPLICATIONS

This application claims the benefit of Japanese Application No. 2001-162638, filed May 30, 2001, the disclosure of which is incorporated herein by reference.

BACKGROUND OF THE INVENTION

1. Field of the Invention

The present invention relates to a perpendicular magnetic recording medium mounted in various magnetic recording apparatuses, and in particular to improvements of an initial growth layer in a magnetic recording layer and in the dispersion angle of a C-axis of a magnetic recording layer.

2. Description of the Related Art

In recent years, rather than focusing on conventional longitudinal magnetic recording method, a vertical magnetic recording method has been attracting attention as a technology to increase magnetic recording density. A medium based on the vertical magnetic recording method (hereinafter referred to as a "perpendicular magnetic recording medium") is composed primarily of a magnetic recording layer made of a hard magnetic material, a under layer that orients the magnetic recording layer in a target direction, and a protective film that protects the surface of the magnetic recording layer. The perpendicular magnetic recording medium may have a backing layer composed of a soft magnetic material to concentrate magnetic fluxes generated by a magnetic head used for recording on the magnetic recording layer. Typically, the perpendicular magnetic recording medium having no soft magnetic backing layer is referred to as a "single-layer perpendicular magnetic recording medium," and the perpendicular magnetic recording medium having a soft magnetic backing layer is referred to as a "double-layer perpendicular magnetic recording medium." Various vertical magnetic recording media have been examined, but it is desired not only to increase the magnetic recording density but also achieve further improvement in performance, such as an increase in an original signal or a decrease in noise.

A factor in degraded performance of the perpendicular magnetic recording medium is an increase in the dispersion angle of a C-axis of the magnetic recording layer. In the vertical recording medium, an easy axis of magnetization of the magnetic recording layer must be oriented perpendicularly to a surface of the medium. However, such orientation alone is insufficient. An increase in the dispersion angle of the C-axis of the magnetic recording layer reduces an amount of magnetic fluxes in the vertical direction and thus lessens the signal output. Further, the amount of magnetic fluxes leaking obliquely from adjacent bits increases, thereby increasing noise. That is, an increase in the dispersion of the C-axis of the magnetic recording layer reduces S/N, which is indicative of a ratio of the signal output from the perpendicular magnetic recording medium to noise occurring therein. Accordingly, to improve the performance of the perpendicular magnetic recording medium, the dispersion of the C-axis of the magnetic recording layer must be minimized.

Another factor in degraded performance of the perpendicular magnetic recording medium is a creation of an initial growth layer in the magnetic recording layer. The magnetic recording layer in the conventional perpendicular magnetic recording medium includes an initial growth layer having a thickness of approximately several nm, and having magnetized components in the in-plane directions. This initial growth layer causes noise. Furthermore, the magnetic recording layer desirably has a small film thickness to enable proper recording the initial growth layer, a decrease in film thickness allows the initial layer to occupy a relatively larger part of the film thickness, thereby reducing the S/N, which hinders a reduction of the film thickness of the magnetic recording layer. Accordingly, to improve the performance of the perpendicular magnetic recording medium, it is necessary not only to reduce the dispersion of the C-axis of the magnetic recording layer, but also to reduce an amount of creation of the initial growth layer in the magnetic recording layer.

SUMMARY OF THE INVENTION

It is an object of the present invention to improve an orientation of a magnetic recording layer in a perpendicular magnetic recording medium, and to reduce an amount of an initial growth layer in the magnetic recording layer, thereby improving performance of the medium, such as through an increase in signal or a decrease in noise.

The under layer plays an important role in reducing the dispersion of a C-axis of the magnetic recording layer and making a thickness of the initial growth layer as close to zero as possible. The under layer plays an important role because (1) selection of the under layer with good orientation properties improves an orientation of the magnetic recording layer, and because (2) when the under layer and magnetic recording layer have similar lattice constants, the layers can be appropriately joined together at their interface, thereby reducing the amount of creation of the initial growth layer in the magnetic recording layer.

The under layer of the magnetic recording medium is generally composed of Ti or a Ti-based alloy such as TiCr. The Ti-based alloy has an hcp (hexagonal closest packing) structure, which is the same as the crystal structure of a Co-based alloy, often used as a magnetic recording layer. Consequently, the Ti- and Co-based alloys have relatively well-matched lattice constants. However, Ti-based alloys react with $O_2$ or $H_2O$ adsorbed on the surface of the substrate, easily generating oxides. Thus, it is likely that in an initial phase of film growth, an amorphous layer is generated to degrade an orientation of the under layer and the magnetic recording layer. Further, the Ti-based alloy and the magnetic recording layer are likely to diffuse mutually, thereby creating an inappropriately oriented initial growth layer in the magnetic recording layer.

In view of the above circumstances, through extensive and repeated examinations, the inventors have found that using non-magnetic NiFeCr or a soft magnetic permalloy-based material as a under layer enables the orientation of the magnetic recording layer to be improved, and the amount of creation of the initial growth layer in the magnetic recording layer to be reduced. The inventors have also found that a combination of a seed layer containing Ti or Ta or a non-magnetic intermediate layer enables further improvement of the magnetic characteristics.

A perpendicular magnetic recording medium based on a first aspect of the present invention includes a under layer, a magnetic recording layer, a protective film, and a liquid lubrication layer sequentially provided on a non-magnetic substrate, wherein the under layer contains non-magnetic NiFeCr.

The perpendicular magnetic recording medium may include a seed layer between the non-magnetic substrate and the under layer, with the seed layer containing Ta or Ti. The seed layer may include a film thickness of 10 nm or less. Alternatively, the perpendicular magnetic recording medium may include a soft magnetic backing layer between the non-magnetic substrate and the under layer.

Furthermore, the perpendicular magnetic recording medium may include an intermediate layer between the under layer and the magnetic recording layer, with the intermediate layer containing a non-magnetic material including at least one of CoCr, CoCrB, Ru, and Pd, all of which are non-magnetic materials.

The perpendicular magnetic recording medium, based on a second aspect of the present invention, includes a soft magnetic backing layer, a under layer, an intermediate layer, a magnetic recording layer, a protective film, and a liquid lubrication layer sequentially provided on a non-magnetic substrate, wherein the under layer contains a permalloy-based soft magnetic material including at least one of NiFe, NiFeCr, NiFeMo, and NiFeNb, all of which are soft magnetic materials, the intermediate layer contains a non-magnetic material selected from a group comprising CoCr, CoCrB, Ru, and Pd, all of which are non-magnetic.

As described above, according to aspects of the present invention, non-magnetic NiFeCr or a soft magnetic permalloy-based material enables proper orientation and can be properly joined to a substrate that is used as a under layer, thereby reducing an amount of creation of an initial growth layer that is present in a magnetic recording layer and causes improper orientation and improper magnetic characteristics. Further, the dispersion angle of an axis of easy magnetization of the magnetic recording layer is reduced. As a result, a high-performance perpendicular magnetic recording medium can be provided that can reduce noise. Further, the amount of creation of the initial growth layer in the magnetic recording layer and the dispersion angle of the axis of easy magnetization are reduced to improve the magnetocrystalline anisotropy. As a result, the thermal stability of the magnetic recording layer is improved so as to make the medium more reliable. Furthermore, if the soft magnetic permalloy-based material is used as a under layer, the magnetic characteristics can be prevented from being degraded by forming the non-magnetic layer using only an intermediate layer.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A first aspect of the present invention relates to a perpendicular magnetic recording medium having a under layer containing non-magnetic NiFeCr. That is, the perpendicular magnetic recording medium based on the first aspect includes a non-magnetic substrate, and a under layer, a magnetic recording layer, a protective layer, and a liquid lubrication layer sequentially provided on the substrate. The under layer contains non-magnetic NiFeCr. The non-magnetic NiFeCr enables proper orientation and can be properly joined to the magnetic recording layer. Thus, using the non-magnetic NiFeCr as a under layer, markedly improves the orientation of the magnetic recording layer, and a creation of an initial growth layer is reduced.

The perpendicular magnetic recording medium constructed as described above may include a single layer or two layers, or may be combined with an intermediate layer, a seed layer, or a soft magnetic backing layer, as required. A first aspect of the present invention will be described with reference to the drawings.

Figure 1:
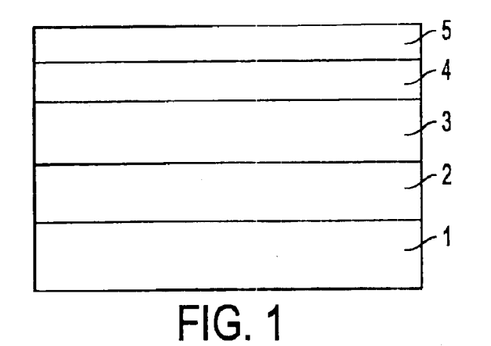
FIG. 1 is a side sectional view schematically showing an example of a single-layer perpendicular magnetic recording medium in accordance with the present invention.

FIG. 1 is a side sectional view schematically showing an example of a single-layer perpendicular magnetic recording medium constructed in accordance with a first aspect of the present invention. As shown in FIG. 1, the single-layer perpendicular magnetic recording medium includes of a non-magnetic substrate 1, an NiFeCr under layer 2 provided on the substrate 1, a magnetic recording layer 3 provided on the under layer 2, a protective film 4 provided on the magnetic recording layer 3, and a liquid lubrication layer 5 provided on the protective film 4.

The non-magnetic substrate 1 may be an arbitrary substrate used for a typical magnetic recording medium and having a smooth surface. For example, the non-magnetic substrate 1 may be a NiP-plated Al alloy, chemically reinforced glass, or crystallized glass.

The under layer 2 is formed of non-magnetic NiFeCr. The term "non-magnetic NiFeCr" as used herein refers to a non-magnetic Ni-based alloy having a compounding ratio of Ni to Fe to Cr selected so as to make the alloy non-magnetic and allow the alloy to have an fcc (face-centered cubic lattice) crystal structure. For example, the alloy may be Ni15Fe25Cr, Ni18Fe25Cr, or Ni15Fe30Cr. However, the present invention is not limited to these materials. In general, non-magnetic NiFeCr provides a good under layer that enables proper orientation and can be properly joined to the magnetic recording layer.

For instance, the magnetic recording layer 3 may be made of a ferromagnetic material composed of an alloy including Co and Cr. The alloy may be CoCrPt, CoCrTa, CoCrPtB, CoCrPtNb, or CoCrPtTa. However, the present invention is not limited to these materials. In addition, the material making the magnetic recording layer of the perpendicular magnetic recording medium may have a hexagonal closest packing structure in which a c-axis is oriented perpendicularly to a film surface.

A seed layer formed of Ti or Ta may be provided between the non-magnetic substrate 1 and the under layer 2, as required. The seed layer acts as a getter that removes $O_2$ or $H_2O$ adsorbed on a surface of the substrate and reduces an roughness of the surface of the substrate, which may degrade an orientation. To improve the orientation of the under layer and reduce an roughness of the surface of the substrate, the seed layer of Ti or Ta may react with $O_2$ or $H_2O$ adsorbed on the surface to become an amorphous layer. The seed layer may have a film thickness of 10 nm or less in order to appropriately form the amorphous layer because the film thickness of 10 nm or less allows the seed layer to easily react with the adsorbed elements to become amorphous. With a film thickness of more than 10 nm, a crystalline layer is prone to be formed in an upper part of the seed layer, thereby possibly degrading the orientation of the under layer or increasing the grain size.

Alternatively, a non-magnetic intermediate layer may be provided between the under layer 2 and the magnetic recording layer 3. The intermediate layer serves to further improve the orientation of the magnetic recording layer and reduce an amount of creation of the initial growth layer in the magnetic recording layer. As a result, the magnetic characteristics can be further improved. Non-magnetic materials for the intermediate layer are not particularly limited but may include CoCr, CoCrB, Ru, and Pd, which are well suited for the lattice parameter of the magnetic recording layer 3.

The protective film 4 is formed of a thin film including, for example, carbon. Alternatively, various thin-film materials may be used that are commonly used as protective films for magnetic recording media.

The liquid lubrication layer 5 may be formed using, for example, a perfluoropolyether-based lubricant. Alternatively, various lubricants may be used that are commonly used as liquid lubrication layer materials for magnetic recording media.

The layers stacked on the non-magnetic substrate can be formed using various film-formation techniques commonly used in the field of magnetic recording media. Layers other than the liquid lubrication layer can be formed using, for example, a DC magnetron sputtering process. Further, the liquid lubrication layer can be formed using, for example, a dip coating process. However, the present invention is not limited to these processes.

Figure 2:
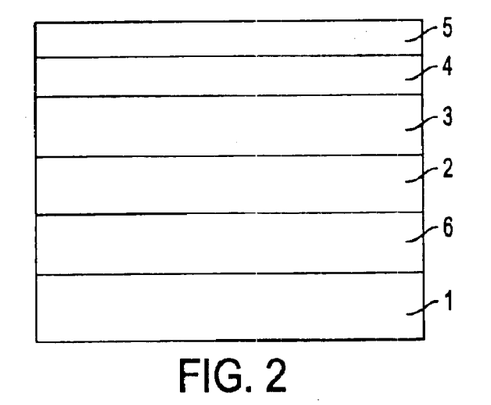
FIG. 2 is a side sectional view schematically showing an example of a double-layer perpendicular magnetic recording medium in accordance with the present invention.

FIG. 2 is a side sectional view schematically showing an example of a double-layer perpendicular magnetic recording medium constructed according to a first aspect of the present invention. As shown in FIG. 2, the double-layer perpendicular magnetic recording medium includes the non-magnetic substrate 1, a soft magnetic backing layer 6 provided on the nonmagnetic substrate 1, the NiFeCr under layer 2 provided on the soft magnetic backing layer 6, the magnetic recording layer 3 provided on the under layer 2, the protective layer 4 provided on the magnetic recording layer 3, and the liquid lubrication layer 5 provided on the protective layer 4. That is, the recording medium of FIG. 2 is constructed similarly to the single-layer perpendicular magnetic recording medium described on FIG. 1, except that the soft magnetic backing layer 6 is provided between the non-magnetic substrate 1 and the under layer 2.

The soft magnetic backing layer 6 can be formed using a crystalline NiFe alloy or a Sendust (FeSiAl) alloy, or CoZrNb, which is an amorphous Co alloy. The soft magnetic backing layer 6 enables a concentration of magnetic fluxes generated by a magnetic head used for recording on the magnetic recording layer. As a result, the magnetic characteristics of the medium can be further improved. To function sufficiently, the soft magnetic backing layer 6 may have a certain film thickness. The optimum value for the film thickness of the soft magnetic backing layer 6 varies depending on the structure and characteristics of the magnetic head used for recording, but may be generally between 10 nm and 500 nm, with productivity taken into account.

The materials forming the non-magnetic substrate 1, the under layer 2, the magnetic recording layer 3, the protective layer 4, and the liquid lubrication layer 5 are similar to those of the single-layer medium previously described. Film formation techniques used are also similar to those previously described for the single-layer medium.

To further improve the magnetic characteristics of the double-layer medium, an intermediate layer may be provided between the under layer 2 and the magnetic recording layer 3. The intermediate layer serves to further improve the orientation of the magnetic recording layer and reduce an amount of creation of the initial growth layer in the magnetic recording layer. The non-magnetic materials forming the intermediate layer are not particularly limited, but include CoCr, CoCrB, Ru, and Pd, which are well-suited for the lattice parameter of the magnetic recording layer 3. However, in a double-layer perpendicular magnetic recording medium, an increase in distance between the soft magnetic backing layer and the magnetic-recording-medium layer (that is, an increase in film thickness of the non-magnetic layer corresponding to the under layer and intermediate layer) may degrade the magnetic characteristics. Thus, if the non-magnetic layer includes a non-magnetic NiFeCr layer and a non-magnetic intermediate layer, the film thicknesses of these layers must be minimized.

Figure 3:
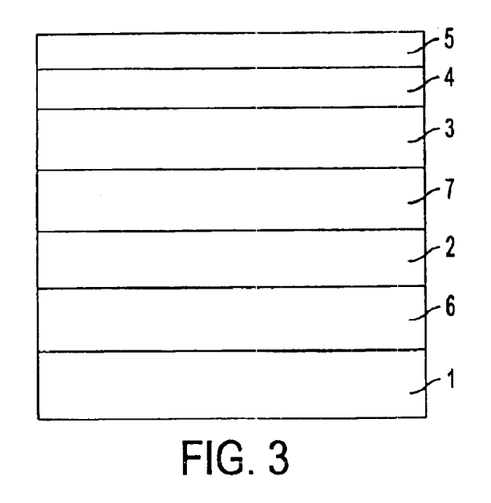
FIG. 3 is another side sectional view schematically showing an example of the double-layer perpendicular magnetic recording medium in accordance with the present invention.

A second aspect of the present invention relates to a perpendicular magnetic recording medium having a under layer containing a soft magnetic permalloy-based material. FIG. 3 is a side sectional view schematically showing an example of a double-layer perpendicular magnetic recording medium constructed according to the second aspect of the present invention.

As shown in FIG. 3, the perpendicular magnetic recording medium includes the nonmagnetic substrate 1, and the soft magnetic backing layer 6, under layer 2, intermediate layer 7, magnetic recording layer 3, protective film 4, and liquid lubrication layer 5 sequentially provided on the non-magnetic substrate 1. The under layer 2 includes a soft magnetic permalloy-based material including at least one of a permalloy (NiFe), a Cr permalloy (NiFeCr), an Mo permalloy (NiFeMo), and a hard perm (NiFeNb), all of which are soft magnetic.

In the medium constructed as described above, the under layer 2 is soft magnetic, thereby requiring an intermediate layer 7 having a non-magnetic material. The non-magnetic materials for the intermediate layer 7 are not particularly limited but include CoCr, CoCrB, Ru, and Pd, which are well suited for the lattice parameter of the magnetic recording layer 3. Further, the materials forming the non-magnetic substrate 1, under layer 2, magnetic recording layer 3, protective film 4, liquid lubrication layer 5, and soft magnetic backing layer 6, as well as film formation techniques, are as described above.

The soft magnetic permalloy-based material used as the under layer 2 has a same crystal structure as non-magnetic NiFeCr. Accordingly, the soft magnetic permalloy-based material functions both as a good under layer that improves the orientation of the magnetic recording layer, and as a soft magnetic backing layer. However, if the soft magnetic backing layer is to be formed only of a soft magnetic permalloy-based material, the soft magnetic backing layer must be sufficiently thick, thereby possibly degrading the magnetic characteristics. Thus, by providing the soft magnetic permalloy-based material on the typical soft magnetic backing layer, as the under layer, and creating the non-magnetic layer including only the intermediate layer as described above, a double-layer medium can be formed without increasing a distance between the soft magnetic backing layer and the magnetic recording layer. That is, even with the intermediate layer, a double-layer medium may be constructed without increasing the thickness of the non-magnetic layer. As a result, it is possible to prevent the thickness of the non-magnetic layer from increasing as a result of the provision of the intermediate layer, while preventing the magnetic characteristics from being degraded. As described above, even with the soft magnetic permalloy-based material, the above-described structure markedly improves the orientation of the magnetic recording layer and reduces the creation of the initial growth layer, as when the under layer is composed of non-magnetic NiFeCr.

EXAMPLES

The perpendicular magnetic recording medium, in accordance with the present invention, will be described below in detail with reference to examples. However, the present invention is not limited to these examples, but may be varied without deviating from the spirit thereof.

In the examples, the methods described below were used primarily to evaluate the magnetic characteristics of the magnetic recording medium obtained.

Torque Measurement Method

Figure 4:
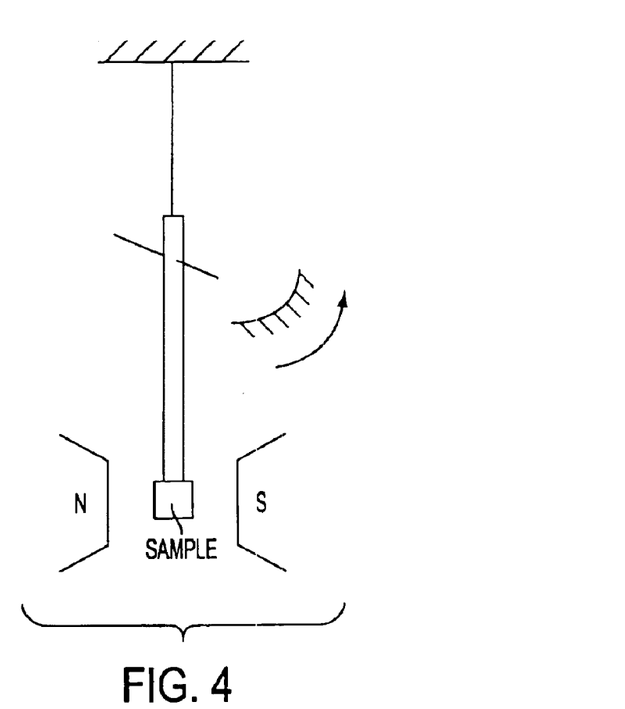
FIG. 4 is a diagram schematically showing a magnetic-torque-meter apparatus used to measure torque.

A torque measurement method is used to determine the magnetic anisotropy of a sample. FIG. 4 is a diagram schematically showing a magnetic torque-meter apparatus used to measure torque. As shown in FIG. 4, when a sample is suspended using an elastic thread and then magnetically saturated using intense magnetic fields, an axis of easy magnetization of the sample rotates in a direction of magnetization. Then, the magnetic anisotropy of the sample can be determined on a basis of an angle at which a rotation of the sample is balanced. For details on torque measurements, refer to p. 231 of Keizo OHTA, "Basis of Magnetic Engineering II" (KYORITSU SHUPPAN CO., LTD.).

Rocking Curve Method

Figure 5:
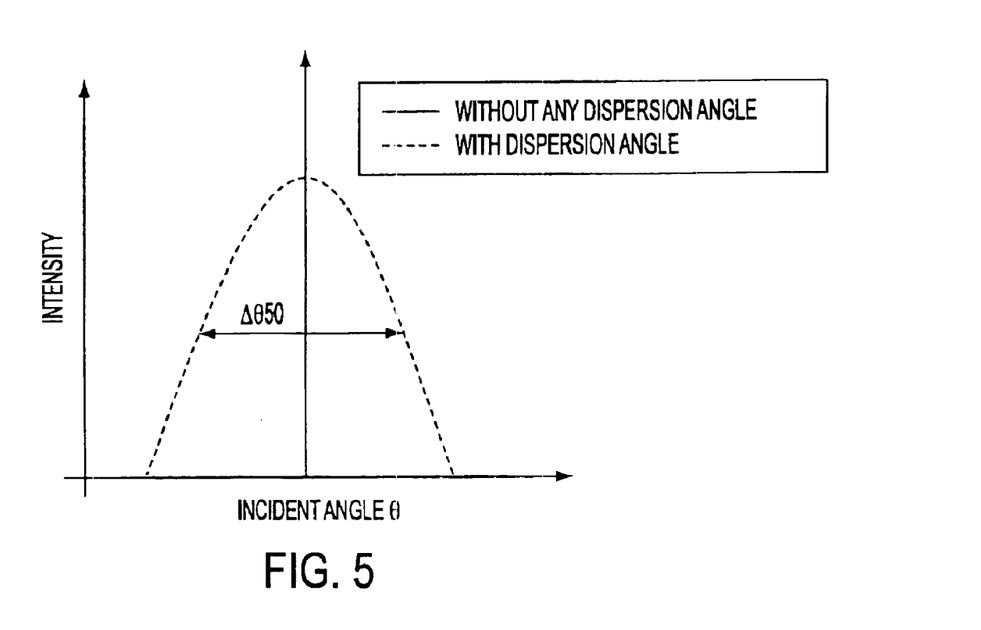
FIG. 5 is a conceptual diagram showing a rocking-curve process.

A rocking curve method is an X-ray-diffraction measurement method that measures a dispersion angle of a particular crystal face. The dispersion angle is measured by varying an incident angle θ with a detected angle (2θ) fixed. FIG. 5 is a conceptual view showing the rocking curve method. If the measured crystal face is free from dispersion (ideal case), a single diffraction line is obtained. On the other hand, if the crystal face has a certain level of dispersion (common case), a curve with a peak is obtained. In this case, a width of the curve corresponding to full width at half maximum is referred to as the "dispersion angle of the axis (Δθ50)," which can be used as a reference for variations in orientation.

Example 1

Example 1 relates to the single-layer perpendicular magnetic recording medium including the non-magnetic substrate. The NiFeCr under layer, the magnetic recording layer, the protective layer, and the liquid lubrication layer are sequentially provided on the substrate. The single-layer perpendicular magnetic recording medium is produced in a following manner:

First, a chemically reinforced glass substrate (for example, an N-10 glass substrate manufactured by HOYA CORPORATION) has a smooth surface. The glass substrate is used as a non-magnetic substrate and is washed. The washed glass substrate is introduced into a sputter apparatus, and a NiFeCr under layer 5 nm in thickness is formed using a Ni15Fe25Cr target, a non-magnetic Ni-based alloy. Subsequently, the substrate is heated using a lamp heater so as to provide the NiFeCr under layer with a surface temperature of 300° C., and then, a CoCrPt magnetic recording layer 30 nm in thickness is formed using a Co20Cr10Pt target. Finally, a protective film 10 nm in thickness including carbon is formed using a carbon target. All film-formation steps other than heating using the lamp heater are executed in accordance with a DC magnetron sputtering process at an Ar gas pressure of 5 mTorr. The stack obtained as a result of the sequential film formation described above is taken out from a vacuum apparatus. A liquid lubrication layer 2 nm in thickness including perfluoropolyether is formed on the protective film using a dip coating process, thereby obtaining a single-layer perpendicular magnetic recording medium.

Then, the characteristics of the single-layer perpendicular magnetic recording medium produced as described above are evaluated in various manners. For purposes of comparison, the single-layer perpendicular magnetic recording medium is evaluated that is produced similarly to the medium in the present example, except that the under layer is formed of TiCr rather than NiFeCr.

First, when the magnetic characteristics of each medium are evaluated using a VSM (vibration sample magnetometer), the medium with the NiFeCr under layer (present example) and the medium with the TiCr under layer (comparative example) are found to have a substantially equivalent coercive force and squareness ratio.

Figure 6A:
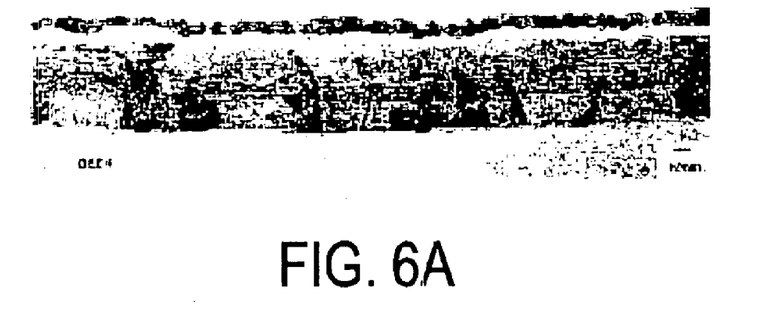
FIG. 6A is an entire TEM image showing a cross section of a single-layer perpendicular magnetic recording medium having an NiFeCr under layer produced in accordance with Example 1 FIG. 6($a$) shows an entire image and FIG. 6($b$) an enlarged image of the periphery of a magnetic-recording-medium layer].
Figure 6B:
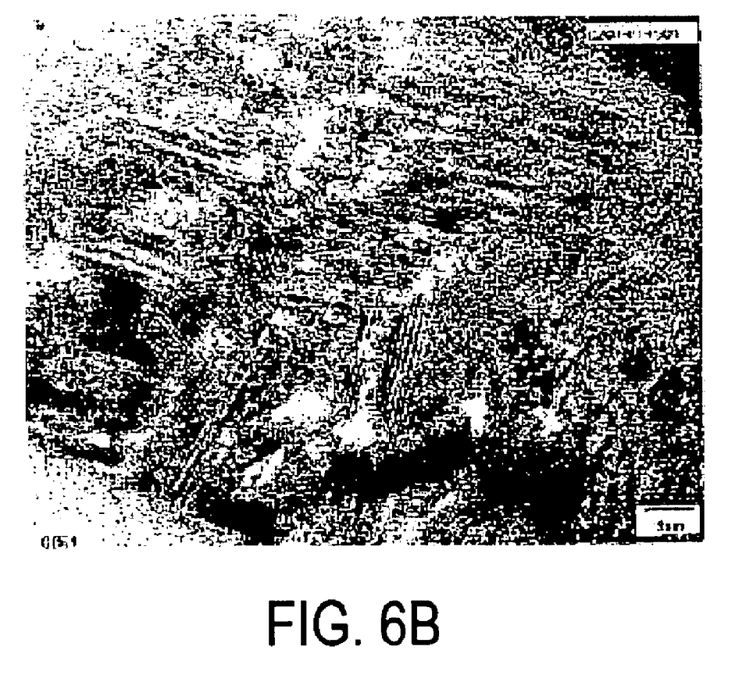
FIG. 6B is an enlarged TEM image showing a periphery of the single-layer perpendicular magnetic recording medium having the NiFeCr under layer produced in accordance with Example 1.
Figure 7A:
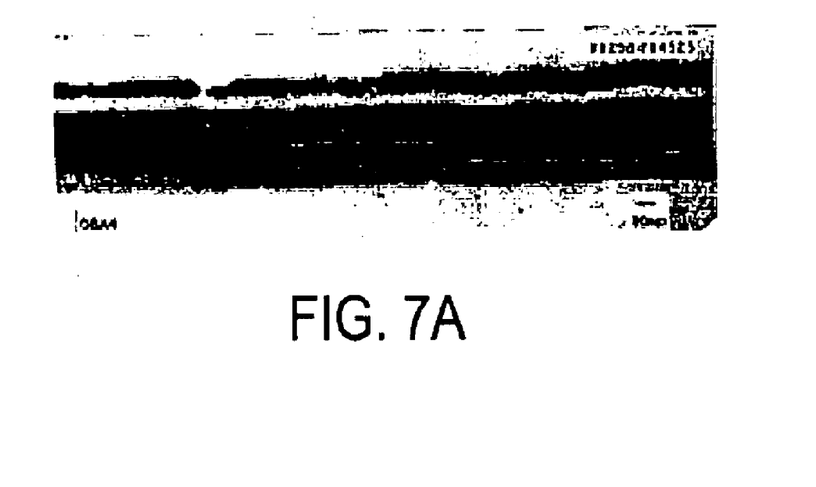
FIG. 7A is a TEM image showing a cross section of an entire image of a single-layer perpendicular magnetic recording medium having a TiCr under layer produced according to Example 1.
Figure 7B:
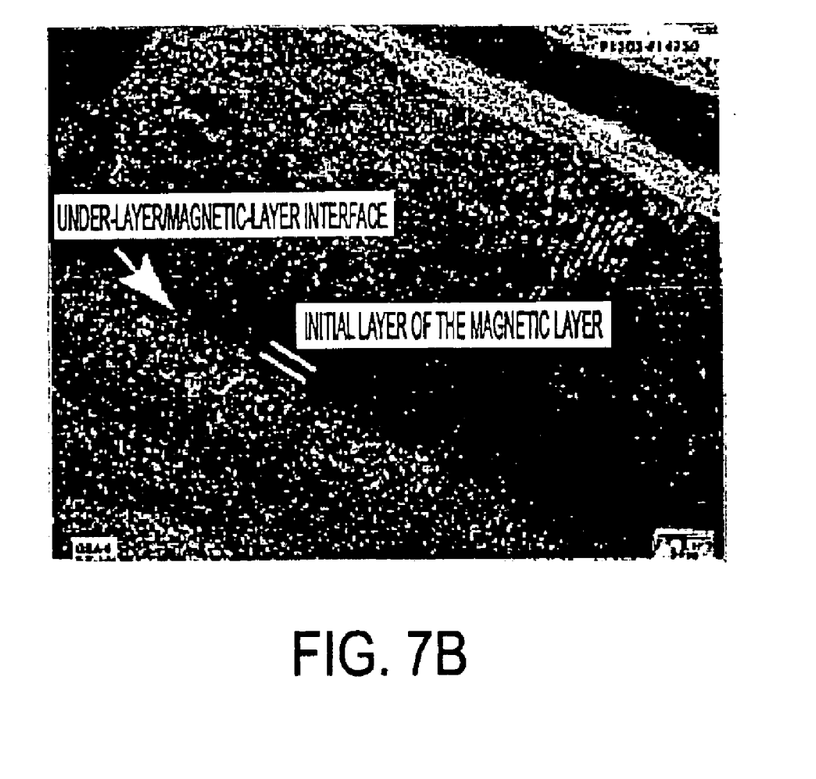
FIG. 7B is the TEM image showing an enlarged image of a periphery of the single-layer perpendicular magnetic recording medium having a TiCr under layer produced according to Example 1.

Then, the initial growth layer in the magnetic recording layer of each medium is observed using a TEM (transmission electron microscope). FIGS. 6A and 6B show a cross-sectional TEM image of the medium with the NiFeCr under layer (present example). FIG. 6A shows an entire image, and FIG. 6B shows an enlarged image of a peripheral portion of the magnetic recording layer. FIGS. 7A and 7B show a cross-sectional TEM image of the medium with the TiCr under layer (comparative example). FIG. 7A shows an entire image, and FIG. 7B shows an enlarged image of a peripheral portion of the magnetic recording layer. In the comparative example shown in FIGS. 7A and 7B, an amorphous layer in which no lattice image is seen is present at the interface between the magnetic recording layer and the under layer. This is the initial growth layer in the magnetic recording layer, which may cause noise. On the other hand, in the medium shown in FIGS. 6A and 6B, a lattice image is observed at an interface between the under layer and the magnetic recording layer, clearly showing that no amorphous layer is present therein.

Then, torque measurements are conducted on the media to compare them for magnetic anisotropy constant Ku. Results of the torque measurements show that the medium used in the comparative example has a magnetic anisotropy constant Ku of $1.14 \times 10^6$ (erg/cc), while the medium used in the present example had a magnetic anisotropy constant Ku of $1.35 \times 10^6$ (erg/cc), which indicates an improvement in Ku. The improvement in Ku is assumed to be due to the fact that the NiFeCr under layer served to prevent the creation of an amorphous layer that is normally present in the initial growth layer of the magnetic recording layer.

Example 2

Example 2 relates to the single-layer perpendicular magnetic recording medium constructed similarly to that in Example 1, except that the seed layer is provided between the non-magnetic substrate and the NiFeCr under layer. That is, the single-layer perpendicular magnetic recording medium in this example includes the non-magnetic substrate. The seed layer, the NiFeCr under layer, the magnetic recording layer, the protective film, and the liquid lubrication layer, which are sequentially provided on the substrate. The single-layer perpendicular magnetic recording medium is produced in a following manner:

First, a chemically reinforced glass substrate (such as an N-10 glass substrate manufactured by HOYA CORPORATION) has a smooth surface. The chemically reinforced glass substrate is used as a non-magnetic substrate and is washed. The washed glass substrate is introduced into the sputter apparatus, and a Ta seed layer 5 nm in thickness is formed using a Ta target. After the seed layer has been formed, a NiFeCr under layer, a CoCrPt magnetic recording layer, and a carbon protective film are sequentially formed in the same manner as in Example 1. Then, as in Example 1, a liquid lubrication layer 2 nm in thickness including perfluoropolyether is formed on the protective film, and a single-layer perpendicular magnetic recording medium is thereby obtained.

Then, the initial growth layer in the magnetic recording layer of the medium obtained as described above is observed using the TEM. The observations indicated that no amorphous initial growth layer is present in the magnetic recording layer, as in the medium used in Example 1, which is shown in FIGS. 6A and 6B.

Then, the dispersion angle of the axis of easy magnetization in the magnetic recording layer of the medium is measured. The dispersion angle of the axis of easy magnetization is measured in accordance with a rocking-curve process using an X-ray diffraction apparatus. For comparative purposes, the medium shown in Example 1 (having a TiCr under layer instead of an NiFeCr under layer) is also measured. The measurements showed that the medium with the TiCr under layer (comparative example) has a rocking-curve full width at half maximum of 9°, whereas the medium with the NiFeCr under layer (present example) has a rocking-curve full width at half maximum of 6°. Therefore, the dispersion angle of the axis of easy magnetization decreases to two-thirds of the original level.

As described above, the Ta seed layer and the NiFeCr under layer serve to eliminate the initial growth layer in the magnetic recording layer, and to reduce the dispersion angle of the axis of easy magnetization in the magnetic recording layer.

Example 3

Example 3 relates to a single-layer perpendicular magnetic recording medium constructed similarly to that of Example 2, except that an intermediate layer is provided between the NiFeCr under layer and the magnetic-recording-medium layer. That is, the single-layer perpendicular magnetic recording medium of this example includes a non-magnetic substrate. The seed layer, the under layer, the intermediate layer, the magnetic recording layer, the protective film, and the liquid lubrication layer are sequentially provided on the substrate. The single-layer perpendicular magnetic recording medium is produced in the following manner:

First, a Ta seed layer is formed on a glass substrate as a non-magnetic substrate, as in Example 2, and then a NiFeCr under layer is formed as in Example 1. Further, an Ru intermediate layer 5 nm in thickness is formed using an Ru target. Subsequently, a CoCrPt magnetic recording layer and a carbon protective film are sequentially formed in exactly the same manner as in Example 1. Then, a liquid lubrication layer 2 nm in thickness is formed on the protective film using a dip coating process, and a single-layer perpendicular magnetic recording medium is thereby obtained. Further, to compare the magnetic characteristics, various media in which the film thickness of the magnetic recording layer varied are produced in the same manner as described above, except that the CoCrPt magnetic recording layer has a film thickness of 10 nm, 15 nm, 20 nm, or 50 nm.

Then, the characteristics of each single-layer medium obtained as described above are examined. First, a cross section of each single-layer medium is observed using the TEM to confirm that no amorphous initial growth layer is present in the magnetic recording layer, as in the medium used in Example 1, which is shown in FIGS. 6A and 6B.

Figure 8:
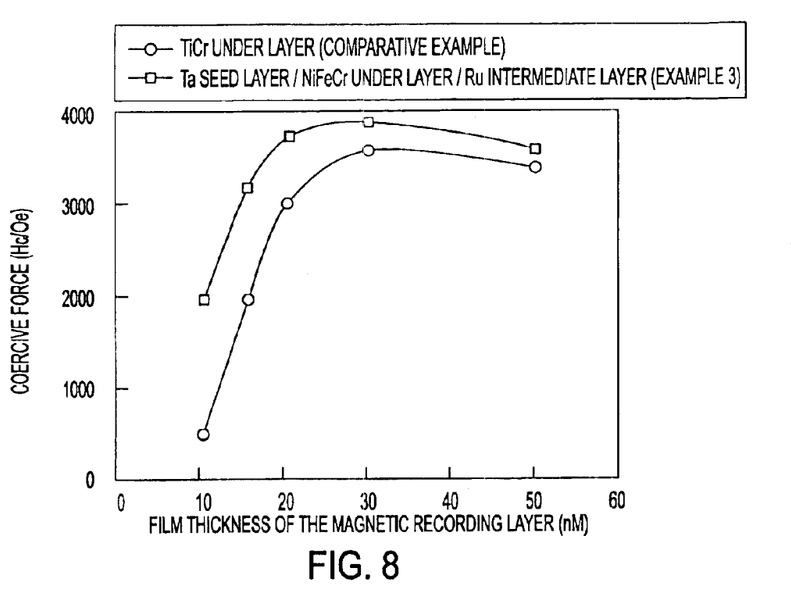
FIG. 8 is a graph showing the variation in coercive force of media having magnetic recording layers of different film thickness produced in accordance with Example 3.

Then, the coercive force of the single-layer media, including magnetic recording layers having different film thicknesses, is measured using the VSM. For comparative purposes, the medium shown in Example 1 (having a TiCr under layer instead of a NiFeCr under layer) is also measured. The results are shown in FIG. 8. As shown in FIG. 8, in the single-layer medium used in the present example, the initial growth layer in the magnetic recording layer is prevented so as to increase the coercive force of the magnetic recording layer compared to the single-layer medium of the comparative example having the same film thickness. Furthermore, the single-layer medium based on the present example has a relatively strong coercive force even when the film thickness of the magnetic recording layer is thin.

Example 4

Example 4 relates to a double-layer perpendicular magnetic recording medium having the NiFeCr under layer. The double-layer perpendicular magnetic recording medium based on this example includes the non-magnetic substrate.

The soft magnetic backing layer, the NiFeCr under layer, the magnetic recording layer, the protective film, and the liquid lubrication layer are sequentially provided on the substrate. The double-layer perpendicular magnetic recording medium is produced similarly to Example 1, except that the soft magnetic backing layer is provided between the non-magnetic substrate and the under layer. That is, the medium is produced in the following manner:

First, a chemically reinforced glass substrate (such as an N-10 glass substrate manufactured by HOYA CORPORATION) has a smooth surface. The chemically reinforced glass substrate is used as a non-magnetic substrate and is washed. The washed glass substrate is introduced into the sputter apparatus, and a CoZrNb amorphous soft magnetic backing layer 200 nm in thickness is formed using a Co10Zr5Nb target. Then, as a under layer, a NiFeCr under layer 5 nm in thickness is formed using a Ni15Fe25Cr target, a non-magnetic Ni-based alloy. Subsequently, the substrate is heated using the lamp heater so as to have a surface temperature of 300° C., and then a CoCrPt magnetic recording layer 30 nm in thickness is formed using a Co20Cr10Pt target. Finally, a protective film 10 nm in thickness including carbon is formed using a carbon target. All film-formation steps, other than heating by the lamp heater, are conducted in accordance with the DC magnetron sputtering process at an Ar gas pressure of 5 mTorr. The stack obtained through the sequential film formation described above is taken out from the vacuum apparatus. A liquid lubrication layer 2 nm in thickness having perfluoropolyether is formed on the protective film by the dip coating process, and a doublelayer perpendicular magnetic recording medium is thereby obtained.

Then, the dispersion angle of the axis of easy magnetization in the magnetic recording layer of the double-layer medium obtained, as described above, is measured. The dispersion angle is measured in accordance with the rocking-curve process using an X-ray diffraction apparatus. For comparative purposes, a double-layer medium is also measured that is produced similarly to the present example, except that this medium has the TiCr under layer instead of the NiFeCr under layer. As a result, the double-layer medium with the TiCr under layer (comparative example) has a rocking-curve half-value width of 6°; whereas the double medium with the NiFeCr under layer (present example) has a rocking-curve half-value width of 4°. Therefore, the dispersion angle of the axis of easy magnetization decreases to two-thirds of the original level.

Further, the cross section of the double-layer medium of the present example is observed using the TEM, to confirm that no amorphous initial growth layer is present in the magnetic recording layer as in the single-layer media of Examples 1 to 3.

Example 5

Example 5 relates to a double-layer perpendicular magnetic recording medium having a under layer includes a soft magnetic permalloy-based material. The double-layer perpendicular magnetic recording medium based on this example includes the non-magnetic substrate. The soft magnetic backing layer, the under layer, the intermediate layer, the magnetic recording layer, the protective film, and the liquid lubrication layer are sequentially provided on the substrate. This double-layer medium is produced in the following manner:

First, as in Example 4, the Co10Zr5Nb target is used to form a CoZrNb amorphous soft magnetic backing layer 200 nm in thickness on a chemically reinforced glass substrate having a smooth surface, and is used as a non-magnetic substrate. Then, as the under layer, a NiFeNbMo under layer 5 nm in thickness is formed using a soft-magnetic Ni14.5Fe4Nb1Mo target. Subsequently, a CoCr intermediate layer 5 nm in thickness is formed using a nonmagnetic Co42Cr target. Subsequently, the substrate is heated using the lamp heater so as to have a surface temperature of 300° C., and then a CoCrPt magnetic recording layer 30 nm in thickness is formed using a Co20Cr10Pt target. Finally, a protective film 10 nm in thickness including carbon is formed using a carbon target. All film-formation steps, other than the heating by the lamp heater, are conducted in accordance with the DC magnetron sputtering process at an Ar gas pressure of 5 mTorr. The stack obtained through the sequential film formation, as described above, is taken out from the vacuum apparatus, a liquid lubrication layer 2 nm in thickness having perfluoropolyether is formed on the protective film by the dip coating process, and a double-layer perpendicular magnetic recording medium is thereby obtained.

Figure 9:
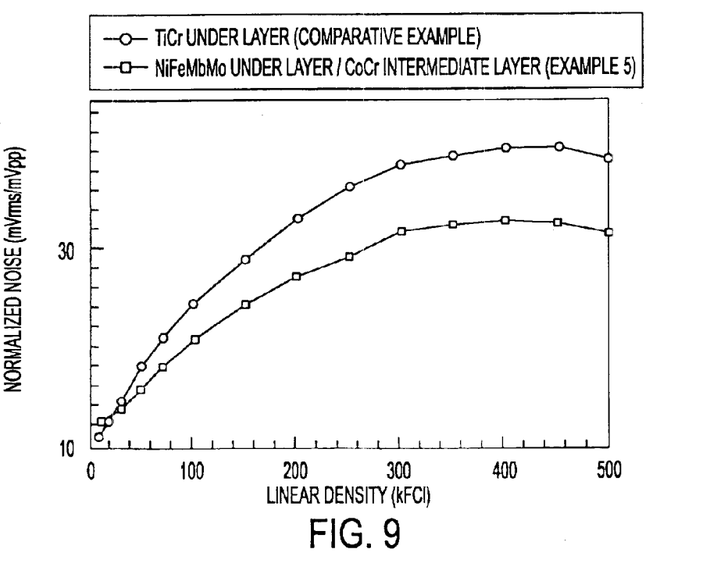
FIG. 9 is a graph showing the noise spectrum of a double-layer perpendicular magnetic recording medium produced in accordance with Example 5.

The recording density of the double-layer medium obtained as described above is varied, and the resulting noise spectra is measured. A read and write tester manufactured by SONY TEKTRONIX Corporation are used to conduct the measurements. For comparative purposes, the double-layer medium of the comparative example produced in Example 4 is similarly measured. The results are shown in FIG. 9. TEM observations indicate that the medium of the present example has no initial layer and has a rocking-curve full width at half maximum of 4.2°. As is apparent from FIG. 9, in the medium of the present example, the initial growth layer in the magnetic recording layer is prevented, and the dispersion angle of the axis of easy magnetization is reduced, thereby lessening noise compared to the double-layer medium of the comparative example.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A perpendicular magnetic recording medium, comprising:
   a non-magnetic substrate;
   a under layer comprising non-magnetic NiFeCr;
   a seed layer, between the non-magnetic substrate and the under layer, comprising Ta or Ti;
   a magnetic recording layer;
   a protective film; and
   a liquid lubrication layer, wherein the under layer, the magnetic recording layer, the protective film, and the liquid lubrication layer are sequentially provided on the non-magnetic substrate.

2. The perpendicular magnetic recording medium according to claim 1, wherein the seed layer comprises a film thickness of 10 nm or less.

3. The perpendicular magnetic recording medium according to claim 1, further comprising:
   an intermediate layer, between the under layer and the magnetic recording layer, having a non-magnetic material comprising CoCr, CoCrB, Ru, or Pd.

4. The perpendicular magnetic recording medium according to claim 2, further comprising:

an intermediate layer, between the under layer and the magnetic recording layer, having a non-magnetic material comprising CoCr, CoCrB, Ru, or Pd.

5. A perpendicular magnetic recording medium, comprising:

a non-magnetic substrate;

a soft magnetic backing layer;

an under layer including non-magnetic NiFeCr;

a magnetic recording layer;

a protective film; and a liquid lubrication layer, wherein the soft magnetic backing layer, the under layer, the magnetic recording layer, the protective film, and the liquid lubrication layer are sequentially positioned on the non-magnetic substrate.

6. The perpendicular magnetic recording medium according to claim 5, further comprising:

an intermediate layer, between the under layer and the magnetic recording layer, having a non-magnetic material comprising CoCr, CoCrB, Ru, or Pd.

7. The perpendicular magnetic recording medium according to claim 5, wherein the non-magnetic NiFeCr includes a substantially face-centered cubic lattice structure.

8. The perpendicular magnetic recording medium according to claim 5, further comprising:

a seed layer between the non-magnetic substrate and the under layer, the seed layer including at least one of Ta and Ti.

9. The perpendicular magnetic recording medium according to claim 8, further comprising:

an intermediate layer between the under layer and the magnetic recording layer, the intermediate layer having a non-magnetic material including at least one of CoCr, CoCrB, Ru, and Pd.

* * * * *

UNITED STATES PATENT AND TRADEMARK OFFICE
CERTIFICATE OF CORRECTION

PATENT NO. : 6,858,320 B2
DATED : February 22, 2005
INVENTOR(S) : Shunji Takenoiri et al.

It is certified that error appears in the above-identified patent and that said Letters Patent is hereby corrected as shown below:

<u>Column 12,</u>
Line 50, change "a" to -- an --.

Signed and Sealed this

Sixteenth Day of August, 2005

JON W. DUDAS
*Director of the United States Patent and Trademark Office*